A. P. McCORMICK.
EGG HOLDER.
APPLICATION FILED SEPT. 27, 1920.

1,362,023.

Patented Dec. 14, 1920.

Anthony P. McCormick
INVENTOR

BY Victor J. Evans
ATTORNEY

WITNESSES:

UNITED STATES PATENT OFFICE.

ANTHONY PATRICK McCORMICK, OF BRIDGEPORT, PENNSYLVANIA.

EGG-HOLDER.

1,362,023.  Specification of Letters Patent.  Patented Dec. 14, 1920.

Application filed September 27, 1920. Serial No. 413,220.

*To all whom it may concern:*

Be it known that I, ANTHONY PATRICK McCORMICK, a citizen of the United States, residing at Bridgeport, in the county of Montgomery and State of Pennsylvania, have invented new and useful Improvements in Egg-Holders, of which the following is a specification.

An object of the invention is to provide a holder of a simple form and construction, that can be cheaply manufactured and which will conveniently hold an egg in an upright position so that the same can be easily tapped or broken and the contents consumed.

The invention comprehends among other features, an egg holder which may be ornamentally fashioned, but which is particularly designed to conveniently support an egg in position for the consumption of the contents thereof, the invention to this end, comprising an egg clip and a supporting clip connected by suitable uprights, the supporting clip being preferably adapted for clamping engagement with a plate and the upright comprehending further, a suitable holder for a spoon or the like.

In the further disclosure of the invention, reference is to be had to the accompanying drawings constituting a part of this specification, in which similar characters of reference denote corresponding parts in all the views, and in which,—

Figure 1:
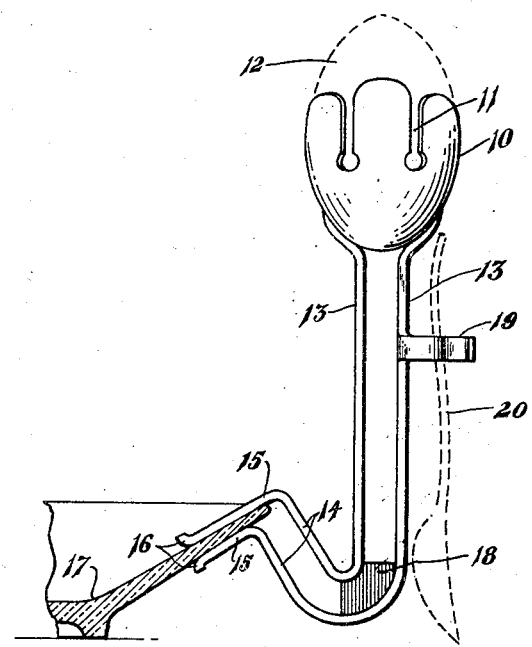
Figure 2:
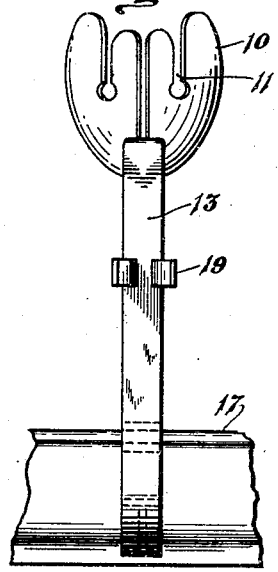

Figure 1— is an elevation of the device showing the same applied, with the plate shown in section, and Fig. 2— is a face view looking at the front of the holder.

Referring more particularly to the views, I provide an egg clip 10 which is preferably formed of sheet metal having a certain inherent resiliency or spring-like action when the same is bent into the cup formation shown, and to provide for an adjustment of the body of the clip to eggs of different sizes, the body is provided with vertical slits 11 so that the clip 10 will readily accommodate itself to the particular size or contour and shape of an egg 12. Uprights 13 have their upper ends suitably secured to the underside of the clip 10 and the lower ends of the uprights are bent upwardly at angles as at 14 and then inwardly to form fingers 15 providing a supporting clip 16, the fingers 15 being slightly widened at their points of engagement with a plate 17 so as to support the egg holder in a vertical position. To provide the sufficient spring-like action necessary on the part of the fingers 15, the lower ends of the uprights may be connected by a cross piece 18 and one of the uprights is preferably provided with a horizontally disposed forked rest or support 19 for a spoon 20.

The device described is preferably made out of stamped metal and it will be apparent that it can be very cheaply manufactured. By reference to the views, it will be seen that the fingers engage with the upper and lower surfaces of the flange of the plate with the lowermost portion of one of the uprights resting upon a table top and thus the egg holder will be conveniently supported adjacent the plate and the spoon disposed in a position for the ready application of the same when the contents of the egg is to be eaten.

Having described my invention, I claim—

1. As a new article of manufacture, an egg holder comprising an egg clip, a plate engaging supporting clip, uprights formed with the supporting clip and connecting with the egg clip and a spoon support carried by one of the uprights.

2. An egg holder comprising an egg clip, a supporting clip and uprights connecting the egg and supporting clip said egg clip being formed in a cup-like fashion with the upper ends of the uprights secured to the underside thereof and said uprights formed integrally with said supporting clip, the latter including plate engaging fingers.

In testimony whereof I affix my signature.

ANTHONY PATRICK McCORMICK.